(12) United States Patent
Fleissner

(10) Patent No.: US 7,367,093 B2
(45) Date of Patent: May 6, 2008

(54) METHOD FOR PRODUCING A NONWOVEN MATERIAL BY HYDRODYNAMIC NEEDLING

(75) Inventor: Gerold Fleissner, Zug (CH)

(73) Assignee: Fleissner GmbH, Egelsbach (DE)

( * ) Notice: Subject to any disclaimer, the term of this patent is extended or adjusted under 35 U.S.C. 154(b) by 283 days.

(21) Appl. No.: 10/520,083

(22) PCT Filed: Jun. 26, 2003

(86) PCT No.: PCT/EP03/50267

§ 371 (c)(1),
(2), (4) Date: Sep. 12, 2005

(87) PCT Pub. No.: WO2004/005019

PCT Pub. Date: Jan. 15, 2004

(65) Prior Publication Data

US 2006/0084334 A1   Apr. 20, 2006

(30) Foreign Application Priority Data

Jul. 5, 2002   (DE) ............... 102 30 555
Jul. 25, 2002   (DE) ............... 102 33 991

(51) Int. Cl.
*D04H 5/02* (2006.01)
*D04H 1/46* (2006.01)
(52) U.S. Cl. ..................................... 28/104
(58) Field of Classification Search ........... 28/104, 28/105, 167, 103, 158; 442/384, 385, 387, 442/389, 408, 412, 413
See application file for complete search history.

(56) References Cited

U.S. PATENT DOCUMENTS

| 4,426,421 A | 1/1984 | Nakamae et al. |
|---|---|---|
| 4,428,998 A | 1/1984 | Hawkinson |
| 4,769,274 A | 9/1988 | Woerner et al. |
| 4,902,564 A * | 2/1990 | Israel et al. ................. 442/408 |
| 5,137,600 A | 8/1992 | Barnes et al. |
| 5,190,802 A | 3/1993 | Pilato |
| 5,334,446 A | 8/1994 | Quantrille et al. |
| 5,645,916 A | 7/1997 | Oathout |
| 5,939,176 A | 8/1999 | Yook |
| 6,022,818 A * | 2/2000 | Welchel et al. ............. 442/384 |
| 6,110,848 A | 8/2000 | Bouchette |
| 6,177,370 B1 | 1/2001 | Skoog et al. |
| 6,550,115 B1 * | 4/2003 | Skoog et al. .................. 28/104 |
| 6,836,937 B1 * | 1/2005 | Boscolo ....................... 28/104 |
| 2002/0013109 A1 | 1/2002 | Nissing |
| 2003/0101556 A1 * | 6/2003 | Fleissner ..................... 28/104 |
| 2005/0066490 A1 * | 3/2005 | Orlandi ....................... 28/104 |
| 2005/0090175 A1 * | 4/2005 | Bergholm et al. .......... 442/408 |

FOREIGN PATENT DOCUMENTS

| EP | 0 836 930 A | 4/1998 |
|---|---|---|
| EP | 0 836 930 B1 | 6/2001 |
| EP | 1 156 147 A1 | 11/2001 |
| WO | WO 02/04729 A1 | 1/2002 |
| WO | WO 2004/005019 A1 | 1/2004 |

* cited by examiner

*Primary Examiner*—A. Vanatta
(74) *Attorney, Agent, or Firm*—Antonelli, Terry, Stout & Kraus, LLP.

(57) ABSTRACT

The novel product consists of hydrodynamically bonded non-woven layers of which at least four layers are stacked and are than joined to one another by only using hard water jets.

4 Claims, No Drawings

METHOD FOR PRODUCING A NONWOVEN MATERIAL BY HYDRODYNAMIC NEEDLING

From U.S. Pat. No. 6,110,848 there is known a three-ply sandwich nonwoven whose outer plies are made up of staple fibers 30-100 mm long and that has in the middle a pulp ply, which can also be made up of a blend of and with other fibers such as natural fibers or synthetic fibers.

It is an object of the invention to form a method for producing a sandwich nonwoven that makes special properties possible. Thus, for example, the end product is to have a high liquid absorption capacity on one side while the other surface is instead to be tight or better suited to the absorption of other liquids, in any case is to differ in its properties from the other surface.

In order to achieve the object, provision is made for developing a method for producing an at least four-ply sandwich nonwoven material by continuous forming of the plies, that is, first the base ply, then the at least two middle plies and finally the cover ply, then continuous bonding of the nonwoven material, four-ply in any case, by hydrodynamic needling alone, followed by drying of the nonwoven material, the two outer plies being produced from nonwovens of staple fibers up to 100 mm long, which are produced by the carding method or formed from spun-bond or melt-blown fibers, and the at least two inner plies covered by the outer plies being produced from unlike pulp fibers or pulp fibers blended with synthetic fibers or natural fibers, and the middle plies, two in any case, having unlike liquid absorption capacities. The pulp fibers with other fibers such as synthetic fibers or natural fibers can also be made up of absorptive substances such as for example superabsorbers.

The possibility of producing the two inner plies from unlike fibers that have unlike purposes and properties has the advantage that such a wipe, hygiene product or the like can perform unlike tasks on the two surfaces. One side for example can absorb more liquid than the other, better rubbing or similar action being possible, however, with this other surface. Thus one inner ply can be made up of longer pulp fibers up to 30 mm long while the other ply can be produced from shorter pulp fibers such as 2-5 mm or from hydrophilic synthetic fibers. Flax fibers, SAP fibers or those with a different cross-sectional profile can also be used. The two inner plies can both have absorptive properties but additionally differ substantially.

The two outer plies are to be made up of carded fiber plies, from spun-bond or melt-blown nonwovens or of fibers different in fiber structure whose fiber lengths can be adapted to the product in question. It is also possible, however, to use a different nonwoven forming process such as spun-bond, melt-blown or the Nanoval method according to DE-PS 199 29 709. Naturally, individually completely preformed tissue plies can also be laid on for sandwich nonwoven formation. A sandwich nonwoven formation is also conceivable in which the individual plies are withdrawn from a roll with rolled-up individual nonwovens, meshes, woven fabrics and the like. If a carding machine is to be used, which produces two or three carded fiber plies at once (i.e., via two or three doffers), then of these only the top ply can be subjected to calendering, hot-air bonding or another kind of pre-bonding, so that the bottom ply, which governs the feel of the finished product, remains velvety.

The invention claimed is:

1. A method for producing an at least four-ply sandwich nonwoven material comprising continuous forming of a nonwoven material comprising first a base ply, then the at least two middle plies and finally a cover ply, then continuous bonding of the nonwoven material by hydrodynamic needling alone, followed by drying of the nonwoven material, the base ply and the cover ply being formed from nonwovens of staple fibers up to 100 mm long, which are produced by a carding method, or of spun-bond or melt-blown fibers and the at least two middle plies covered by the base ply and cover ply being produced from pulp fibers or pulp fibers blended with synthetic fibers or natural fibers, wherein one of the at least two middle plies is produced from fibers different than fibers from which another of the at least two middle plies is produced and has unlike liquid absorption capacities than those of the another of the at east two middle plies.

2. The method for producing a nonwoven material of claim 1, wherein one of the middle plies is produced from a mesh-like nonwoven, a mesh of arbitrary plastic or of arbitrary other fibers.

3. The method for producing a nonwoven material of claim 1, wherein the sandwich nonwoven is outwardly covered by a mesh-like layer.

4. The method for producing a nonwoven material of claim 1, wherein one of the middle plies is made of pulp fibers up to 30 mm long and another of the middle plies is made of shorter pulp fibers shorter than the pulp fibers of the one of the middle plies or from hydrophilic synthetic fibers.

* * * * *